Jan. 9, 1934.　　　　　E. J. PROTIN　　　　　1,942,518

PIPE JOINT

Filed June 22, 1933

INVENTOR
Edward J. Protin,
By Archworth Martin,
Attorney.

Patented Jan. 9, 1934

1,942,518

UNITED STATES PATENT OFFICE 1,942,518

PIPE JOINT

Edward J. Protin, Charleroi, Pa., assignor, by mesne assignments, to Pittsburgh Steel Company, Pittsburgh, Pa., a corporation of Pennsylvania Application June 22, 1933. Serial No. 677,086

1 Claim. (Cl. 285—146)

My invention relates to pipe joints for tubes or pipes, such as oil-well pump tubing, rotary well-drilling columns, well casings, etc.

With pipe joints of the usual type wherein the adjacent ends of pipes are connected by a threaded collar failures frequently occur, particularly in the case of drill columns and pump tubing, by reason of the constant vibration to which the pipes are subjected. There is a sort of "weaving" action, whose effect is concentrated at approximately the end turns of the threads, this bending motion causing the said outer turns of the threads to bite into the pipe ends and break them off.

Again, the threads may become deformed, and thus result in leaky joints. The deforming or distortion of the threads is quite rapid where the joint becomes loosened somewhat. Also, there is considerable wear on the threads through repeated screwing and unscrewing of the joints, which results in leakage at the threads.

In the case of drill pipe, there is tendency towards creeping of the pipe sections because of various stresses such as that resulting from the weight of the drill columns on the threads which are, of course, on helical lines advancing downwardly, and that resulting from the rotational force applied to the drill bit by the shaft which extends down through the drill pipe. If the pipe sections are rigidly held against this creeping movement, leakage will occur at the joints, and the joints will become weakened and finally broken through the weaving or whipping action above referred to.

One object of my invention is to provide a joint wherein the threads are relieved of strains during bending and weaving of a pipe column, and wherein looseness which may occur through this whipping movement of the pipe column is automatically taken up and a water-tight joint constantly maintained.

Another object of my invention is to provide a joint for drill columns of such form that not only is leakage prevented from the interior of the pipe to the exterior thereof, but entry of salt water, sulphur water, or other corrosive agent from the exterior of the pipe is prevented, thereby protecting the sealing surfaces and the joint threads from corrosion.

Still another object of my invention is to provide a joint that will remain fluid-tight, even though the threads become worn.

Figure 1:
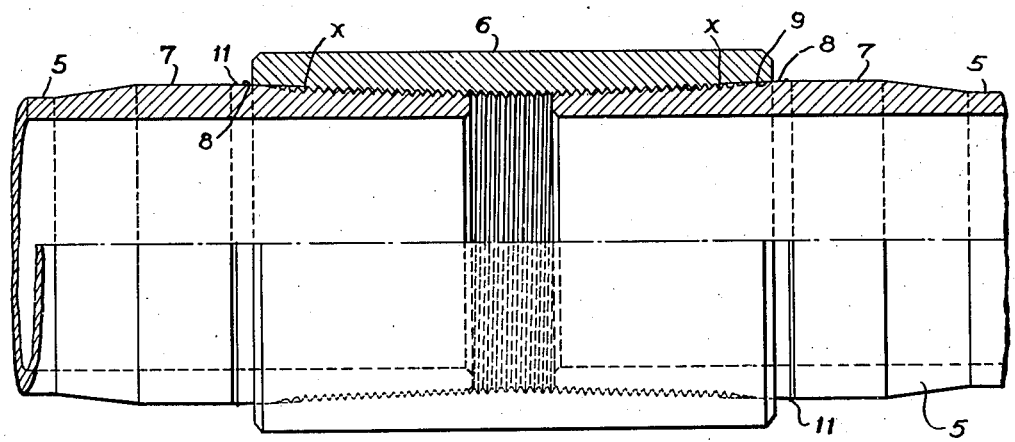
Figure 2:
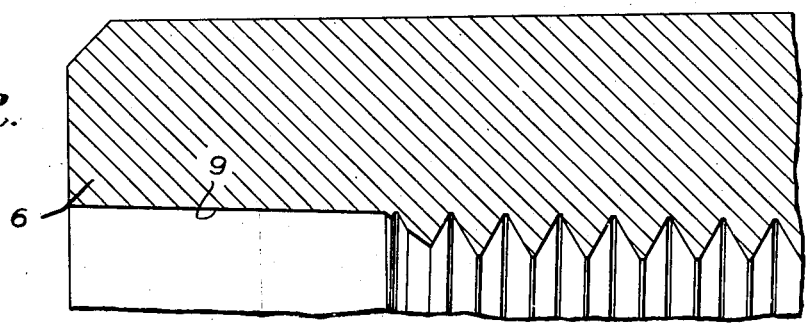
Figure 3:
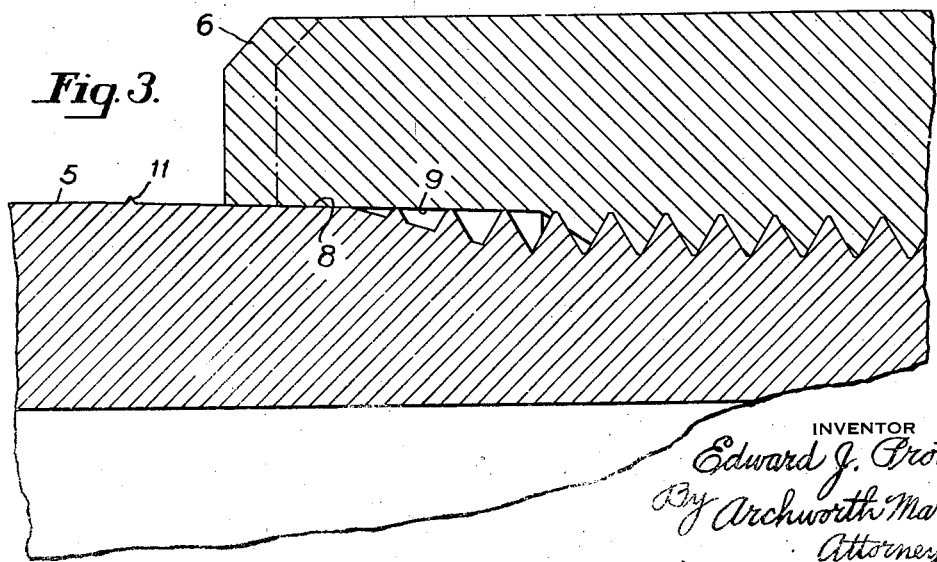

One form which my invention may take is shown in the accompanying drawing, wherein Figure 1 is a longitudinal view, partially in section, of a portion of two pipes and their coupling sleeve; Fig. 2 is a sectional view, on an enlarged scale, of a portion of the coupling sleeve of Fig. 1, and Fig. 3 is a view, on an enlarged scale, of a portion of the structure of Fig. 1.

The invention is hereinafter described as employed more particularly in drill columns for rotary well drilling. In such installations, it is desirable not only to prevent leakage of the flushing water that is supplied through the pipe to the drilling bit, but to also keep the sludge that moves upwardly along the outer side of the column from entering the joint, particularly where such sludge contains salt water, sulphur water, or like corrosive agent.

The pipes or tubes are indicated by the numeral 5, and may be of the usual form, except that their end portions are of the particular form hereinafter described. A coupling sleeve 6 is employed in the usual manner, except that its ends are shaped to agree with the particular contour given to the end portions of the pipes 5.

The pipes 5 in the vicinity of their ends have their walls thickened somewhat as indicated at 7 and including the threaded portions, by an upsetting operation or the like, so as to provide increased strength at these points, and also to permit of conveniently forming a bevelled or tapered surface 8. These surfaces 8 are machined so as to facilitate the making of a sealed joint. The tapered surfaces are parallel to the taper of the threads on the pipe ends, in directions longitudinally of the pipe, and are shown as approximately in line with the roots of said threads.

A coupling sleeve has a tapered surface 9 at each end thereof which is parallel to the adjacent tapered surface 8, and complemental therewith. Those surfaces 8 are also machined, so that, when they are brought snugly into engagement with the surfaces 9, a water-tight seal will be produced.

A gauge mark 11 may be provided adjacent to each tapered shoulder 8, as a guide to workmen in assembling the pipe sections, so that he can tell when the pipes have been properly screwed home in the coupling sleeves.

The threads on the pipe ends 9 are continued beyond the point X, on the surface 8, to allow for creeping of the pipes and couplings as above-referred to. The tapered surfaces 9 of the coupling overlie the threads beyond X, and are maintained in snug contact with the smooth surface 8, because such looseness of fit as tends to develop through side sway of the column is automatically taken up by the coupling referred to.

It will be understood that if threads were formed on the tapered surfaces 9, the sealing effect referred to would be lost.

The iron-to-iron or steel-to-steel contact between the tapered surfaces 8 and 9 makes a particularly rigid joint, and one which will not become deformed and thus permit the threads to receive the strains of vibration and bending. Furthermore, the coupling is, by reason of the extensions at 9, of greater length than the ordinary type of coupling.

The coupling is of such form that it may be employed with standard forms of threaded pipe, but its particular utility will, of course, be in connection with a pipe having a tapered surface such as the surface 8.

The area of contact between the surfaces 8—9 may be ¼ inch wide or greater, depending upon conditions, such as size of pipe, etc. In the drawing, the surfaces 9 are each shown being equal to about 1/8th of the distance from the mid point of the coupling sleeve to its extremities.

I claim as my invention:—

Drill column structure or the like, comprising pipes having their adjacent ends tapered and threaded, the tapering surfaces being continued beyond the inner ends of the threads, and collars threaded intermediate their ends for engagement with the threads of the pipes and having their end portions extended beyond the said threads, and having an unthreaded zone whose surface is in longitudinal alinement with the roots of the collar threads and machined for watertight fit with the said continued tapering surfaces of the pipe ends, the pipe threads being continued beyond the collar threads and clearance being provided between the adjacent extremities of the pipes to provide for creeping of the pipes toward one another.

EDWARD J. PROTIN.